United States Patent
Detwiler et al.

(10) Patent No.: US 11,818,050 B2
(45) Date of Patent: Nov. 14, 2023

(54) NONLINEAR TRAFFIC SHAPER WITH AUTOMATICALLY ADJUSTABLE COST PARAMETERS

(71) Applicant: Microsoft Technology Licensing, LLC, Redmond, WA (US)

(72) Inventors: Thomas Frederick Detwiler, Huntsville, AL (US); Thomas Abner Basnight, Raleigh, NC (US); Suraj Balasubramanian, Austin, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 10 days.

(21) Appl. No.: 17/334,043

(22) Filed: May 28, 2021

(65) Prior Publication Data
US 2022/0385582 A1 Dec. 1, 2022

(51) Int. Cl.
*H04L 47/22* (2022.01)
*H04L 43/0894* (2022.01)
*H04L 47/762* (2022.01)
*H04L 47/78* (2022.01)

(52) U.S. Cl.
CPC .......... *H04L 47/22* (2013.01); *H04L 43/0894* (2013.01); *H04L 47/762* (2013.01); *H04L 47/781* (2013.01)

(58) Field of Classification Search
CPC ... H04L 43/0894; H04L 47/22; H04L 47/762; H04L 47/781
See application file for complete search history.

(56) References Cited

U.S. PATENT DOCUMENTS

| | | |
|---|---|---|
| 2003/0223445 A1 | 12/2003 | Lodha |
| 2008/0209186 A1* | 8/2008 | Boden ............... H04L 47/215 712/225 |
| 2012/0157038 A1 | 6/2012 | Menezes et al. |
| 2012/0281536 A1* | 11/2012 | Gell ............... H04W 28/06 370/235 |

(Continued)

FOREIGN PATENT DOCUMENTS

EP 1123604 A2 8/2001

OTHER PUBLICATIONS

"International Search Report & Written Opinion issued in PCT Application No. PCT/US22/027540", dated Aug. 25, 2022, 13 Pages.

*Primary Examiner* — Melanie Jagannathan
(74) *Attorney, Agent, or Firm* — Weaver IP L.L.C.

(57) ABSTRACT

A traffic shaping circuit regulates packets transferred by a transmission resource into a network (e.g., a network on a chip) on behalf of a client. The packet transfers are selectively enabled or disabled based on a current budget value. The budget value is modified based on a packet-transfer cost in response to transferring a packet into the network. The rate of packet transfers into the network is monitored. A cost-adjustment signal is generated based on the rate of packet transfers. The packet-transfer cost is modified in response to the cost-adjustment signal for accounting for a subsequent-packet transfer into the network. The cost-adjustment signal may indicate an increase or decrease of the packet-transfer cost and/or a budget limit, both of which are read from a cost table comprising records ordered based on respective packet-transfer cost values. The packet-transfer cost and/or a budget limit are configurable.

20 Claims, 7 Drawing Sheets

(56) References Cited

U.S. PATENT DOCUMENTS

| | | | |
|---|---|---|---|
| 2012/0327779 A1* | 12/2012 | Gell | H04L 47/2475 370/235 |
| 2014/0269292 A1* | 9/2014 | Kalkunte | H04W 28/14 370/232 |
| 2017/0206529 A1* | 7/2017 | Raleigh | G06Q 40/03 |
| 2018/0331929 A1* | 11/2018 | Gandhi | H04M 15/59 |

* cited by examiner

Cost Table 330

| | 328 | 336 | Transfer-Rate Threshold 338 | | 340 |
| --- | --- | --- | --- | --- | --- |
| | | | 502 | 504 | |
| 420 — 1 | Packet-Transfer Cost 1 | Budget Limit 1 | Transfer-Count Threshold 1 | Transfer-Cycle-Count Threshold 1 | Idle-Time Threshold 1 |
| 422 — 2 | Packet-Transfer Cost 2 | Budget Limit 2 | Transfer-Count Threshold 2 | Transfer-Cycle-Count Threshold 2 | Idle-Time Threshold 2 |
| 424 — 3 | Packet-Transfer Cost 3 | Budget Limit 3 | Transfer-Count Threshold 3 | Transfer-Cycle-Count Threshold 3 | Idle-Time Threshold 3 |
| 426 — 4 | Packet-Transfer Cost 4 | Budget Limit 4 | Transfer-Count Threshold 4 | Transfer-Cycle-Count Threshold 4 | Idle-Time Threshold 4 |
| 428 — 5 | Packet-Transfer Cost 5 | Budget Limit 5 | Transfer-Count Threshold 5 | Transfer-Cycle-Count Threshold 5 | Idle-Time Threshold 5 |
| 430 — 6 | Packet-Transfer Cost 6 | Budget Limit 6 | Transfer-Count Threshold 6 | Transfer-Cycle-Count Threshold 6 | Idle-Time Threshold 6 |

NONLINEAR TRAFFIC SHAPER WITH AUTOMATICALLY ADJUSTABLE COST PARAMETERS

BACKGROUND

A network traffic shaper may throttle the rate at which a client (e.g., a processor, a packet scheduler, a transmitter, etc.) sends information over a network, such as an IP network, Ethernet network, or network on a chip. The rate may be controlled in an attempt to avoid congestion. In some networks, a network congestion state, or flow control information, may be provided to a transmitter for determining when to throttle traffic. However, in other networks, the congestion or flow control information may be unavailable or impractical to provide for traffic shaping purposes. For example, in a mesh-based network with dozens or hundreds of clients accessing the mesh simultaneously, it may be impractical to provide feedback to a transmitter regarding the state of network congestion because the cost of detecting and distributing this information in the mesh may be too high, and the relevance of such information may not be assured (e.g., when the state of congestion in the network changes before the information can be utilized).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer readable mediums that store code for performing methods are described herein. In one aspect, a method for shaping traffic comprising packets transferred by a transmission resource into a network (e.g., a network on a chip) on behalf of a client is performed in a traffic-shaping circuit. The method comprises selectively enabling or disabling packet transfers into the network by the transmission resource based on a budget value. In response to transferring a packet into the network by the transmission resource, the budget value may be modified based on a packet-transfer cost. A rate of packet transfers into the network performed by the transmission resource may be monitored. A cost-adjustment signal may be generated based on the rate of packet transfers into the network by the transmission resource. The packet-transfer cost may be modified in response to the cost-adjustment signal for a subsequent-packet transfer into the network by the transmission resource.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The present disclosure is related to shaping traffic transmitted into a network, such as a network on a chip, in an effort to adaptively reduce congestion on the network. In general, a traffic shaper may throttle the rate at which data from a client (e.g., a CPU core, processing engine, memory controller, cache, peripheral component interconnect express (PCIE) bridge, packet scheduler, etc.) is sent over a network. In general, in some traffic shaping systems, traffic congestion or flow control information may be received from external nodes so that transmission rates may be adapted based on the external conditions. However, in other systems, the congestion or flow control information may be unavailable or impractical to use for traffic shaping purposes. For example, in a mesh-based network with dozens or hundreds of clients accessing the mesh simultaneously, it may be impractical to provide congestion-state feedback for use in traffic control because of the high cost of detecting and distributing this kind of information. Furthermore, the relevance of such information may not be assured by the time it is available for use in traffic flow control. In such cases, it may be desirable to implement the traffic shaper disclosed herein to vary its behavior with a high degree of configurability to self-monitor and throttle.

A traffic shaper may utilize a credit-based system, where the shaper maintains a transaction budget, and as packet transfers occur, the budget is reduced by the cost of a packet transfer (e.g., a packet-transfer cost or a transaction cost). For example, a packet-transfer cost may be proportional to the length of a specific transmission or to the relative weight of a client requesting the transaction compared to its peers. As long as the budget is higher than some threshold (e.g., the cost of one transaction), the client is permitted to transfer a packet. The budget may be replenished by adding transfer credit, and the budget may be capped at some upper limit value.

In the present disclosure, a traffic shaping circuit (i.e., a traffic shaper) with programmable features is described. The traffic shaper allows for automatically and dynamically modifying shaper parameters (e.g., packet-transfer costs and budget limits, among other things), which may effectively throttle the rate of packet transfers into the network. The shaper may comprise a cost table with a plurality of records, where each record may include a respective cost value for transferring a packet into the network, and/or a respective budget limit (e.g., a maximum budget level) for enabling and disabling packet transfers. Each cost table record may be indexed by a dynamic read-pointer that may be increased or decreased to change the current set of parameters utilized by the traffic-shaping circuit. In addition to the cost and budget limit, each table record may store parameters for monitoring a rate of transmission activity and indicating when the read-pointer should increase to the next higher table record (e.g., storing a higher cost or same cost), or for indicating inactivity (e.g., idle cycles) to cause the read-pointer to decrease to the next lower table record (e.g., storing a lower or same cost). In one embodiment, incrementing the read-pointer (e.g., increasing cost) may be governed by exceeding a number (M) of packets transmitted in a number (N) of clock cycles. Decrementing the read-pointer (e.g., lowering the cost) may be governed based on being idle for some number (P) of clock cycles (e.g., clock cycles without a packet transmission). M, N, and P may all be stored within a cost table record. The table records may be ordered. In one example, table records may be ordered based on increasing relative cost. The read-pointer may not wrap at the boundaries of the table, and the initial read-pointer value may be configurable.

Regardless of the cost of a packet transfer, in some embodiments, the traffic-shaping circuit may utilize an epoch timer and epoch credit for adding credit to the budget over time. The epoch timer and epoch credit input may be programmable. In some embodiments, a congestion controller with global, though potentially stale, measurements of congestion in a network may be utilized to modify the epoch time and epoch credit to reduce client transmissions throughout the network fabric (e.g., a mesh fabric).

Use of a cost table and the automatic (e.g., programmable) increases or decreases in pointer values to change the cost of a packet transfer may allow clients that request data transfers some level of burstiness at each packet-transfer cost level before penalizing the client and reducing its transfer rate (e.g., by increasing the cost of each transmission). With a full mesh implementation, the same network links may be shared by numerous clients, so persistent bursts of traffic should likely be discouraged by the network on-ramps. Therefore, the nonlinear behavior of this traffic shaper may be highly productive in reducing traffic congestion.

Figure 1:
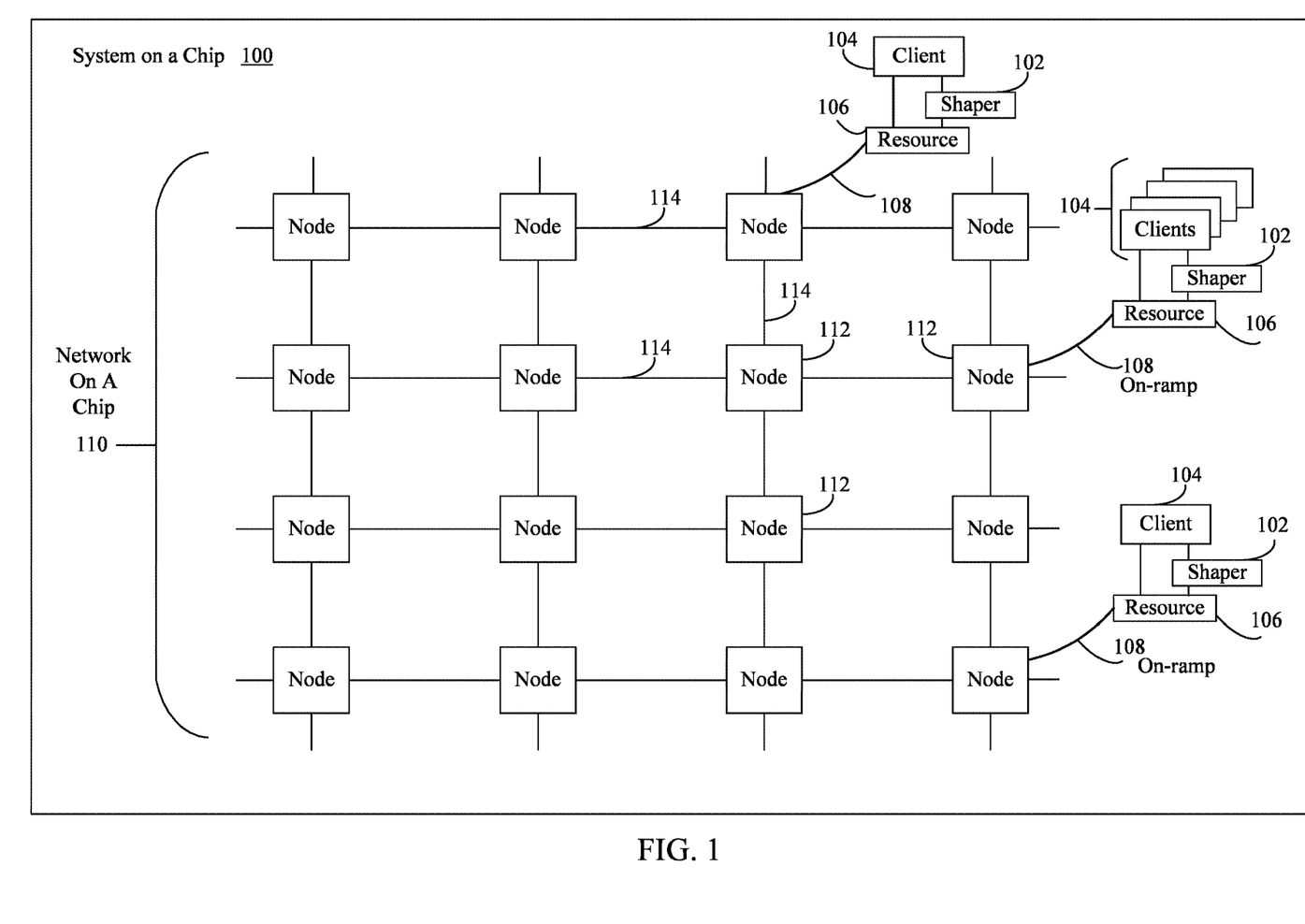
FIG. 1 is a block diagram of a system comprising a traffic shaping circuit for dynamically regulating transmissions into a network on a chip, according to an example embodiment.

Embodiments for dynamically shaping packet traffic in a network may be implemented in various ways. For example, FIG. 1 is a block diagram of a system 100 comprising a traffic shaping circuit for dynamically regulating transmissions into a network on a chip, according to an example embodiment. As shown in FIG. 1, system 100 comprises plurality of traffic shaping circuits 102, a plurality of clients 104, a plurality of transmission resources 106, a plurality of network on-ramps 108, a network on a chip 110, a plurality of nodes 112, and a plurality of network links 114. Each network on-ramp 108 comprises a traffic shaping circuit 102 and a transmission resource 106, such as a first-in-first-out queue or buffer. System 100 is described in detail as follows.

In some embodiments, system 100 may comprise a system on a chip (SOC) comprising network on chip 110. Network on a chip 110 may be configured to route traffic between components within the SOC. In some embodiments, the SOC may comprise a CPU and may be implemented within an electronic device such as computing and/or communications device (e.g., the SOC may comprise a datacenter processor). Although, the network described with respect to FIG. 1 is referred to as network on a chip 110, the present disclosure comprising traffic shaping circuit 102 may be implemented in any suitable type of network, for example, an IP network, Ethernet network, a wireless network, a network on a chip, etc. Furthermore, system 100 may be implemented in an SOC, a desktop or personal computer, a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system; a Microsoft® Windows phone, etc.), a wearable computing device (e.g., a head-mounted device including smart glasses such as Google® Glass™, Oculus Rift® by Oculus VR, LLC, etc.), a gaming console/system (e.g., Nintendo Switch®, etc.), an appliance, a set top box, etc.

Network on a chip 110 may comprise a plurality of nodes 112 communicatively coupled via a plurality of links 114, which provide interconnections for communications among a plurality of clients within the SOC. Each node 112 may comprise internal connections configured to couple a set of input links 114 to a set of output links 114. Although network on a chip 110 is shown in FIG. 1 as a type of mesh network, the present disclosure is not limited to any specific network topology. For example, traffic shaping circuit 102 may be network agnostic and may be implemented in a network having any suitable network topology (e.g., two-dimension, n-dimensional, n-cube, or k-ary n-cube mesh, star, linear, ring, tree, etc.). Network on a chip 110 may comprise a constrained or over subscribable interconnect between multiple clients. For example, if every client 102 tried to send messages to each other simultaneously, the network may not be able to keep-up with traffic processing which may cause network congestion. In some embodiments, a plurality of clients coupled to network on a chip 110 may regulate their own packet transfers with a circuit such as traffic shaping circuit 102. In general, traffic shaping circuit 102 is configured to govern traffic in a network where clients may be greedy and could overwhelm the network. For example, a sustained burst of packet transfers of a single client, continuously trying to inject traffic into the network, may oversaturate the network. Traffic shaping circuit 102 implemented in conjunction with a client may throttle the client's transmissions into network on a chip 110 and reduce excessive bursts of packet transfers.

Each client 104 may comprise a device or a node configured to transfer packets via a transmission resource 106 and network on a chip 110 to a plurality of similar or various types of clients that may also be coupled to network on a chip 110. As shown in FIG. 1, there may be a plurality of clients 104 that share a transmission resource 106, and are governed by a single traffic shaping circuit 102. In some embodiments, client 104 may comprise a processing engine (e.g., a CPU core) or an entity that provides data for transmission such as a memory controller or a cache (e.g., an L2 cache, L3 cache, L4 cache), a PCIE Bridge, etc. For example, client 104 may provide a command for, or may request, data to be transmitted over network on a chip 110 to another client, or may provide the data itself for transmission via transmission resource 106.

Transmission resource 106 may be communicatively coupled to client 104 and traffic shaping circuit 102, and may comprise any suitable logic, circuitry, interfaces and/or code that is configurable to connect client 104 to network on a chip 110, for example, via network on-ramp 108, and control the transmission of packets for client 104 to another client coupled to network on a chip 110. In some examples, transmission resource 106 may comprise a first-in-first-out queue or buffer to store messages until the network accepts them. Transmission resource 106 may also comprise circuits to select a routing path or otherwise adapt or classify messages for transport on the network on a chip 110.

Network on-ramp 108 may comprise a communications link from transmission resource 106 to one or more nodes 112 and/or one or more links 114 in network on a chip 110. A packet transfer may comprise the transmission of data (e.g., a transmission unit or message) from client 104 to another client coupled to network on a chip 110. The packet transfer may be referred to as a transfer, a transaction, or a transmission. In some embodiments, each client 104 coupled to network on a chip 110 may have its own network on-ramp 108 and shaping circuitry 102. Alternatively, network on-ramp 108 and shaping circuit 102 may be coupled to and support communications for multiple clients 104 where the transfer cost function may be adjusted for each client or client type.

Traffic shaping circuit 102 may be configured to control the timing, or rate, of packet transfers into network on a chip 110 by adjusting the cost of transferring a packet relative to a budget (and other traffic control parameters), based on feedback from transmission side measurements rather than feedback from the network or receiver side (e.g., congestion notifications, round trip delay, etc.). In general, traffic shaping circuits 102 may be disposed at, or be a part of, the on-ramps of a network between a client and a router, and may throttle network access by greedy clients that may otherwise consume too much of the network's resources. In other words, traffic shaping circuit 102 may be configured to make a decisions as to when and/or at what rate packets may be transmitted on behalf of client 104 to control the amount of traffic on network on a chip 110.

Figure 2:
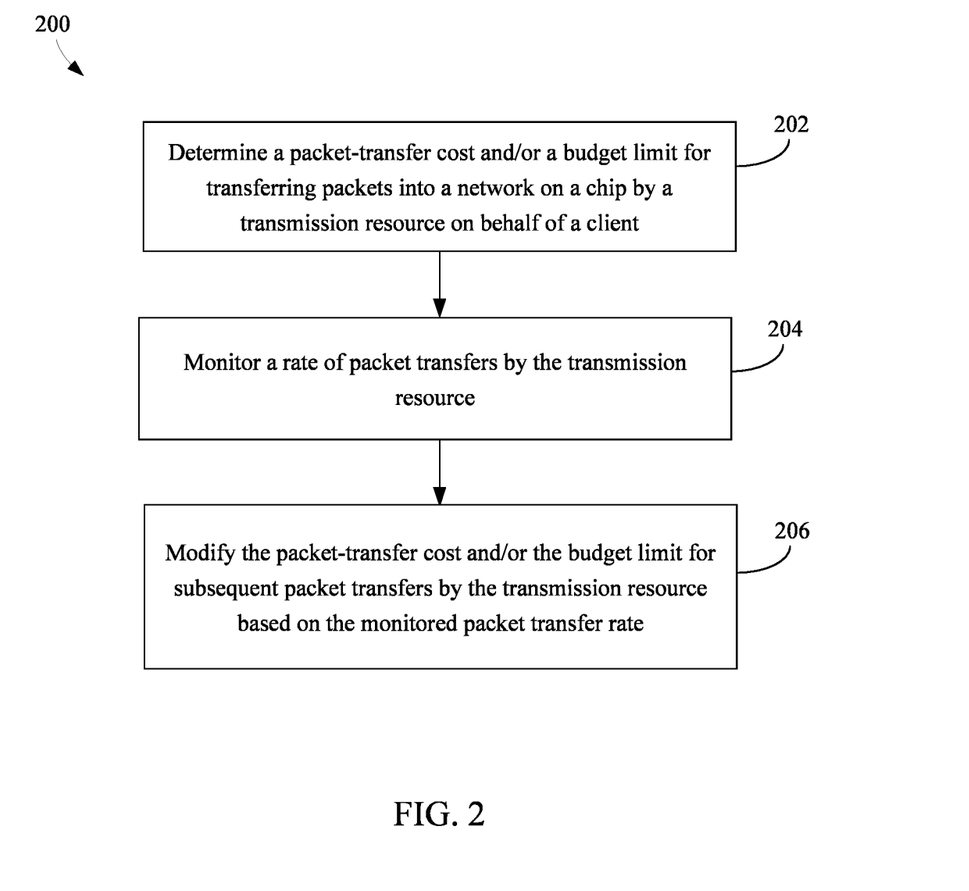
FIG. 2 is a flowchart of a method for controlling a packet transfer rate by dynamically adjusting packet-transfer cost and/or budget parameters, according to an example embodiment.

Traffic shaping circuit 102 may operate in various ways to perform its functions. For instance, FIG. 2 is a flowchart 200 of a method for controlling a packet transfer rate by dynamically adjusting packet-transfer cost and/or budget parameters, according to an example embodiment. In an embodiment, traffic shaping circuit 102 may operate according to flowchart 200. Flowchart 200 is described as follows with reference to FIGS. 1, 3, and 7.

Figure 3:
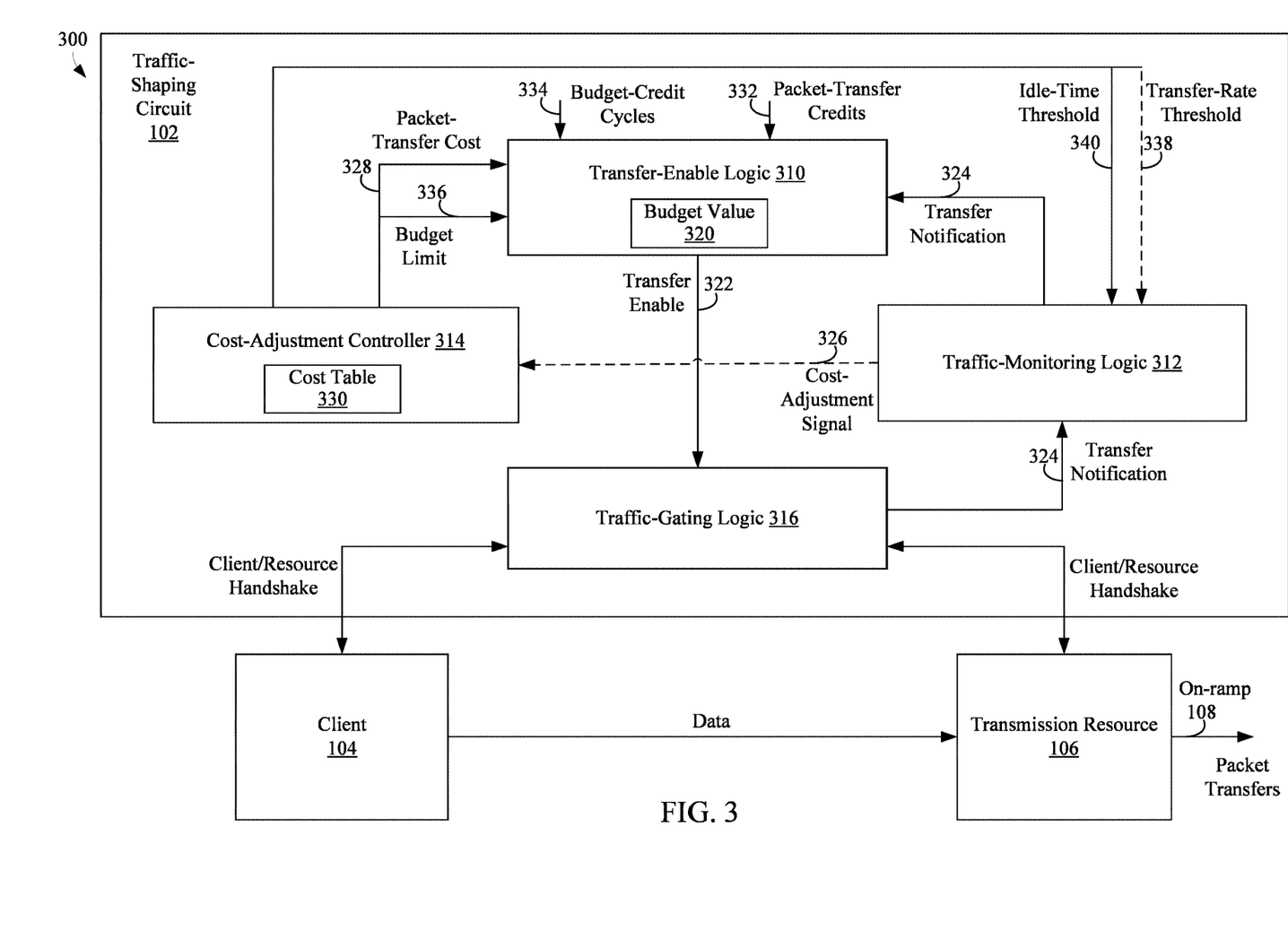
FIG. 3 is a block diagram illustrating functions performed by a traffic shaping circuit that dynamically adjusts packet-transfer cost and/or budget parameters, according to an example embodiment.

FIG. 3 is a block diagram of a system 300 illustrating functions performed by a traffic shaping circuit that dynamically adjusts transfer cost and/or budget parameters, according to an example embodiment. For example, system 300 comprises traffic shaping circuit 102, client 104, transmission resource 106, network on-ramp 108, transfer enable logic 310, traffic-monitoring logic 312, a cost-adjustment controller 314, and traffic gating logic 316. System 300 further comprises a transfer enable 322, a transfer notification 324, a cost-adjustment signal 326, a packet-transfer cost 328, a cost table 330, packet-transfer credits 332, budget credit cycles 334, a budget limit 336, a transfer-rate threshold 338, and an idle-time threshold 340.

Figure 7:
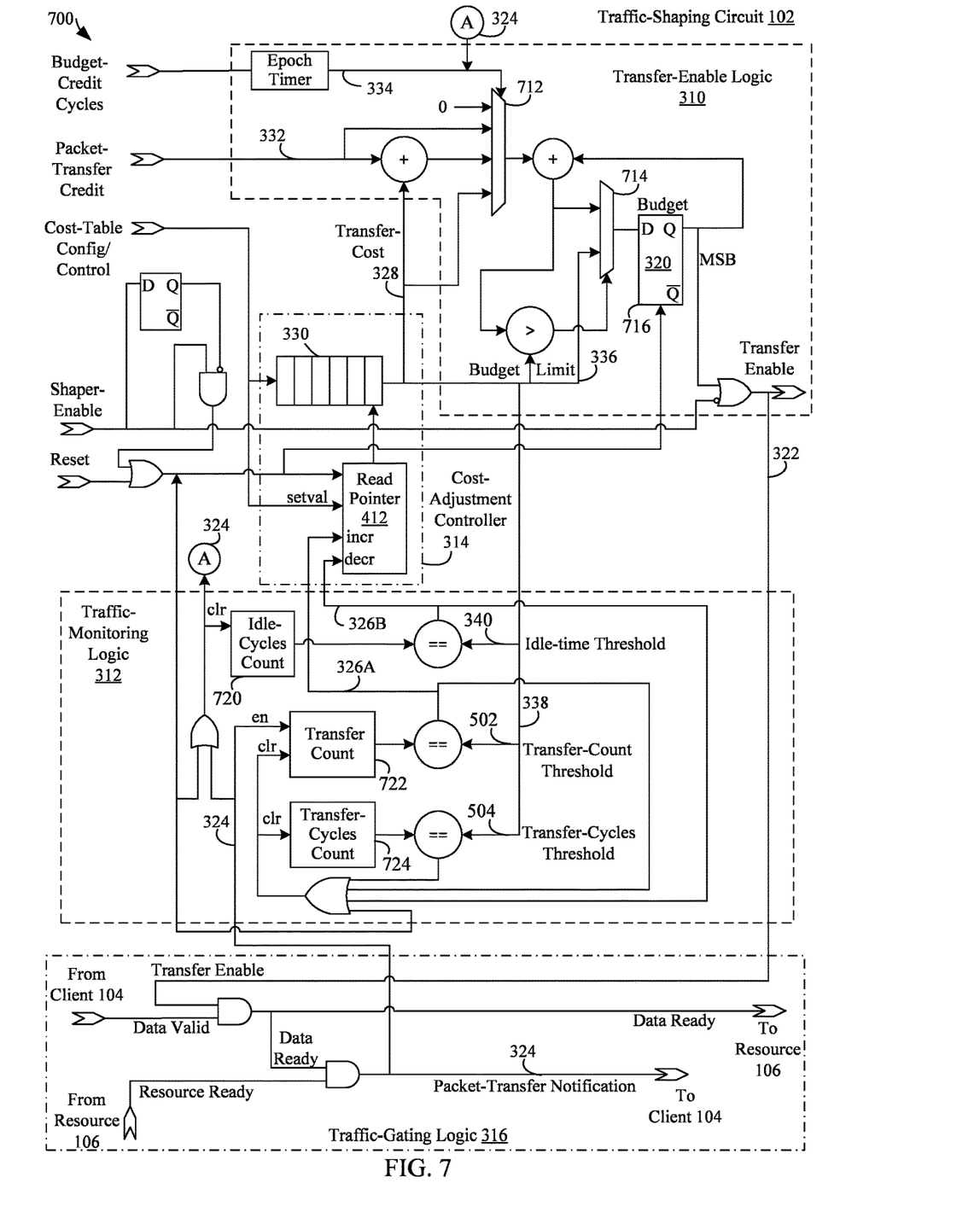
FIG. 7 is a block diagram of a traffic shaping circuit that dynamically adjusts packet-transfer costs and/or budget limit parameters, according to an example embodiment.

FIG. 7 is a block diagram of a system 700 comprising a traffic shaping circuit that dynamically adjusts packet-transfer cost and/or budget limit parameters, according to an example embodiment. System 700 comprises, among other things, traffic shaping circuit 102, client 104, transmission resource 106, transfer enable logic 310, traffic-monitoring logic 312, cost-adjustment controller 314, and traffic gating logic 316. System 700 further comprises transfer enable 322, transfer notification 324, cost-adjustment signals 326A and 326B, packet-transfer cost 328, cost table 330, packet-transfer credit 332, budget credit cycles 334, budget limit 336, transfer-count threshold 502, transfer-cycles count threshold 504, and idle-time threshold 340. Also shown in system 700 are a multiplexer 712, a multiplexer 714, a budget register 716, an idle-cycle counter 720, a packet-transfer counter 722, and a transfer-cycle counter 724.

In some embodiments systems 300 and 700 may be implemented within system 100. For purposes of illustration, systems 300 and 700 are described in detail as follows with respect to flowchart 200 of FIG. 2.

Flowchart 200 begins with step 202. In step 202, a packet-transfer cost and/or a budget limit is determined for transferring packets into a network on a chip by a transmission resource on behalf of a client. Transfer-enable logic 310 may be configured to store and determine budget value 320. Budget value 320 may be utilized to determine whether packet transfers are enabled. For example, if budget value 320 drops too low, packet transfers may be disabled. For each packet that is transferred onto network on a chip 110, a value of packet-transfer cost 328 may be deducted from budget value 320 (e.g., packet-transfer cost 328 may be stored as a negative value). Moreover, one or more packet-transfer credits 332 may be added to budget value 320 at budget-credit cycles 334, which may be received by transfer-enable logic 310 as a timing signal (e.g., a programmable epoch timer may output budget-credit cycles 334). In some instances both of the credit and the cost may be applied to budget value 320 concurrently (e.g., a value of packet-transfer credit 332 less packet-transfer cost 328 may be added to budget value 320). In some embodiments, budget value 320 may be capped at budget limit 336 such that if an amount of packet transfer credit 332 being added to budget value 320 causes budget value 320 to be greater than budget limit 320, budget limit 320 may be stored as budget value 320 instead of adding the packet-transfer credit 332 value to the budget. A plurality of packet transfer cost 328 values and/or a plurality of budget limit 336 values may be stored in cost table 330, and current values utilized in transfer-enable logic 310 for packet transfer cost 328 and/or budget limit 336 may be determined by reading a record from cost table 330.

In step 204, a rate of packet transfers by the transmission resource is monitored. For example, transmission resource 106 may be configured to transmit packets onto network on-ramp 108 and network on a chip 110 on behalf of client 104. Traffic gating logic 316 may be configured to facilitate a handshake between client 104 and transmission resource 106 for each packet transmission, and may provide transfer notification 324 to transfer-monitoring logic 312 each time a packet-transfer is confirmed. Traffic-monitoring logic 312 may be configured to determine a rate of packet transfers and/or an idle period of transmission resource 106 based on transfer notification 324 signals.

In step 206, the packet-transfer cost and/or the budget limit are modified for subsequent packet transfers performed by transmission resource 106 based on the monitored rate of packet transfers. For example, traffic-monitoring logic 312 may be configured to analyze the rate of packet transfers based on transfer notification signals 324, and depending on the rate, traffic monitoring logic 312 may transmit cost-adjustment signal 326 (or cost-adjustment signal 326A of FIG. 7) to cost-adjustment controller 314. In this regard, traffic monitoring logic 312 may transmit cost adjustment signal 326 (or 326A) if the measured packet transfer rate exceeds transfer-rate threshold 338 (described in more detail with respect to FIGS. 4, 5, and 7). Cost-adjustment controller 314 may be configured to modify the value of packet-transfer cost 328 and/or the value of budget limit 336 based on cost adjustment signal 326 (described in more detail with respect to FIGS. 4 and 5). The modified packet-transfer cost 328 value and/or budget limit 336 value may be applied when adjusting budget value 320 for one or more subsequent packet transfers by transmission resource 106. In this manner, the rate of transferring packets may be decreased if packet-transfer cost 328 is increased such that budget 320 drains more quickly as larger costs are applied per packet transfer. Alternatively, or in addition, the rate of transferring packets may be decreased if budget limit 336 is reduced, as this may also cause budget 320 to drain sooner by capping budget value at a lower level then than used for previous transfers. In other words, the packet transfer rate may be reduced (or throttled) as packet transfers are momentarily disabled, more often over time, due to raising packet-transfer cost 328 and/or lowering budget limit 336. As such, a sustained burst of packet transfers for client 104 may be regulated to avoid oversaturation of network on a chip 110, where traffic shaping circuit 102 self-adjusts in reaction to bursts of packet transfers occurring in transmission resource 106 (e.g., without awareness of how the rest of network on a chip 110 is handling traffic).

Figure 4:
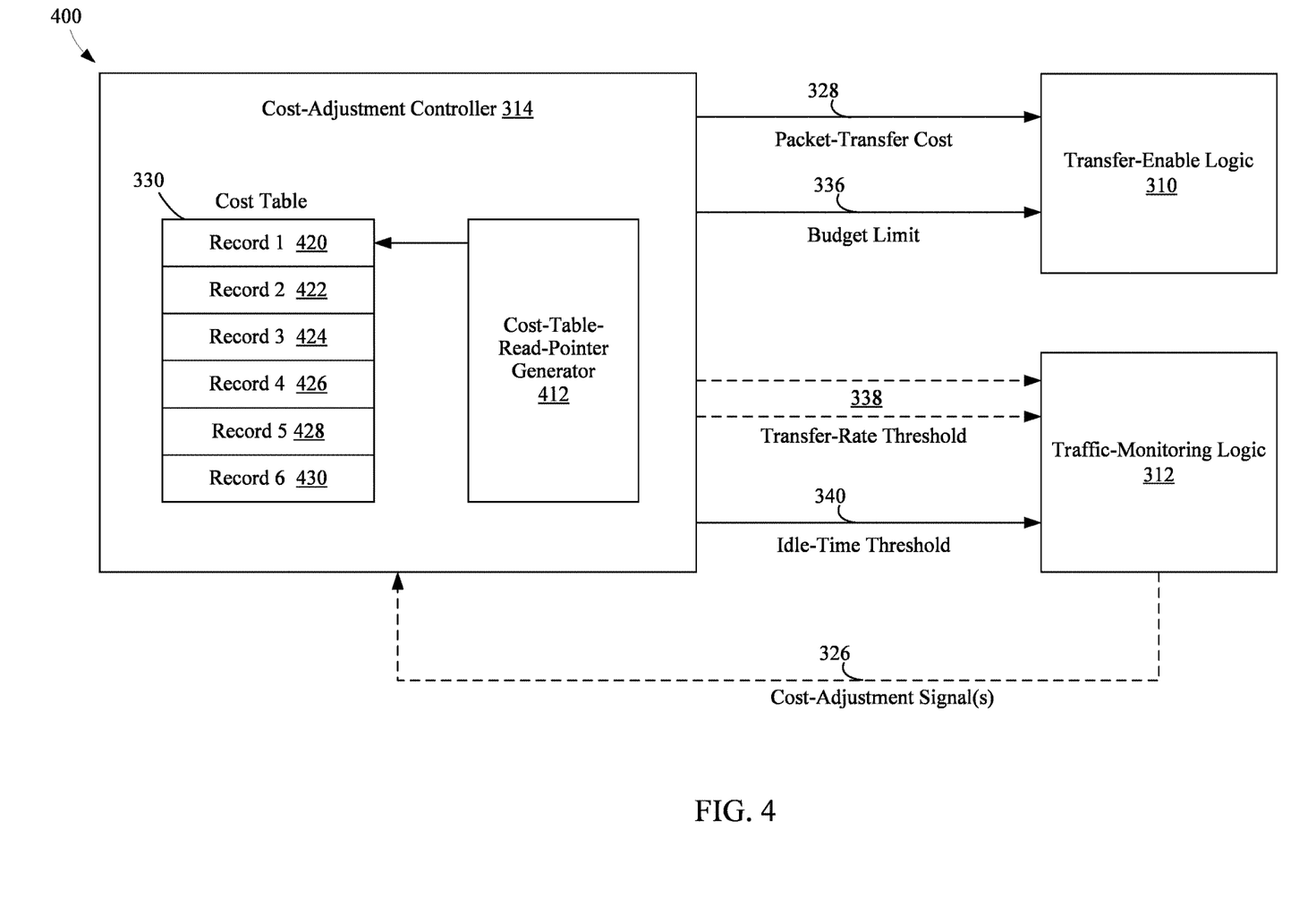
FIG. 4 is a block diagram of a system comprising a cost-adjustment controller with a cost table for storing parameters for shaping packet transmission rates, according to an example embodiment.
Figure 5:
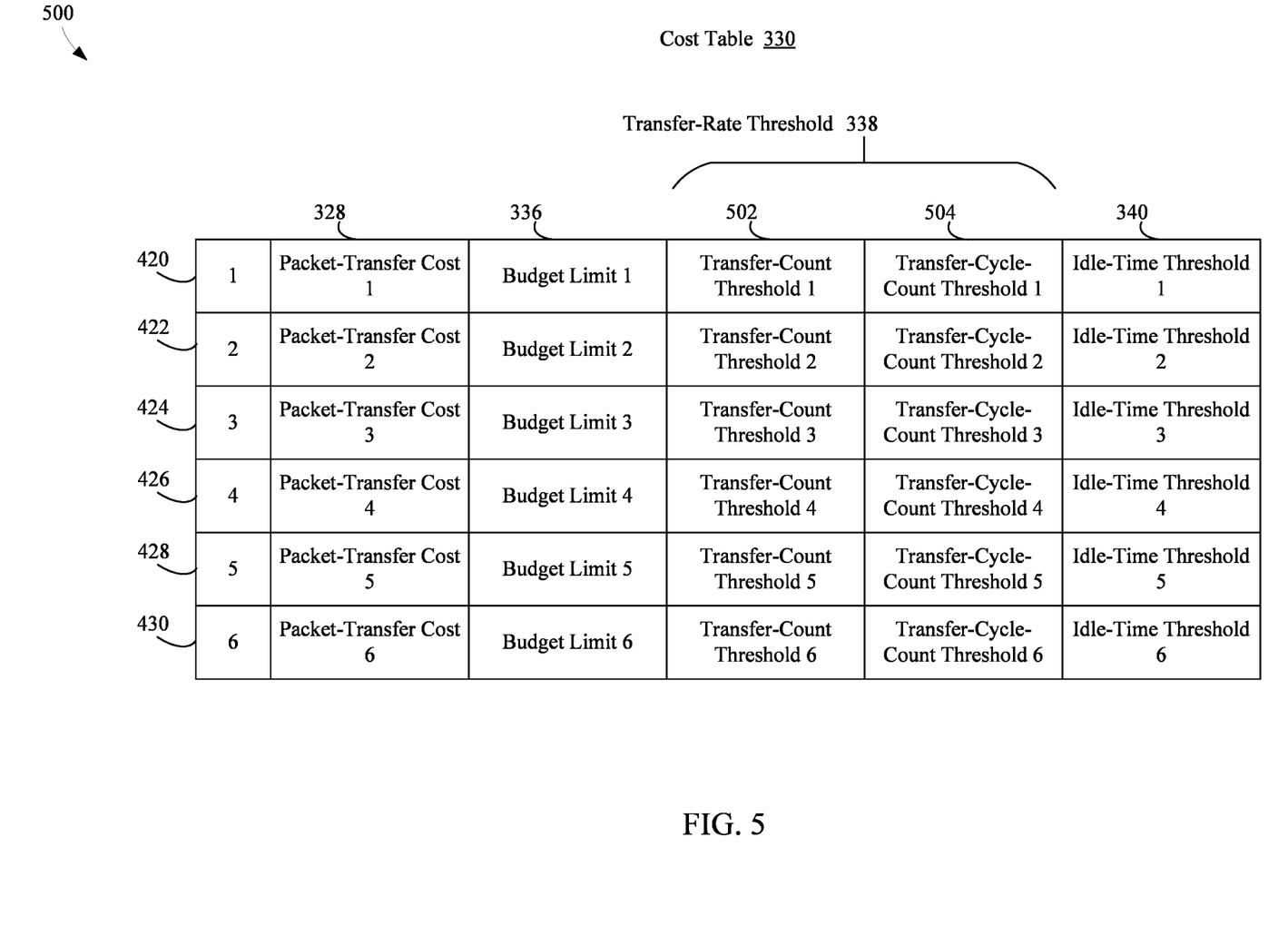
FIG. 5 is a diagram of the cost table of FIG. 4 and stored parameters utilized for shaping packet transmission rates, according to an example embodiment.

Cost-adjustment controller 314 may operate in various ways to perform its functions. For instance, FIG. 4 is a block diagram of a system 400 comprising a cost-adjustment controller with a cost table for storing parameters for shaping packet transmission rates, according to an example embodiment. Moreover, FIG. 5 is a block diagram of a system 500 comprising the cost table of FIG. 4 and the stored parameters utilized for shaping packet transmission rates, according to an example embodiment.

In some embodiments systems 400 and 500 may be implemented within systems 100, 300, and/or 700. For purposes of illustration, systems 400 and 500 are described in detail as follows.

In some embodiments, system 400 may comprise cost-adjustment controller 314, transfer enable logic 310, and traffic monitoring logic 312. Cost-adjustment controller 314 may comprise cost table 330 and cost-table-read-pointer generator 412. Cost table 330 may comprise a plurality of records comprising record 420, record 422, record 424, record 426, record 428, and record 430, which may be referred to as records 420-430.

In some embodiments, system 500 may comprise cost table 330 and records 420-430. Records 420-430 may each comprise a respective set of parameters where each respective set of parameters may comprise one or more of a packet-transfer cost 328, a budget limit 336, a transfer-rate threshold 338, and an idle-time threshold 340. Transfer-rate threshold 338 may be represented in various ways. For example, in some embodiments, transfer-rate threshold 338 may comprise separate parameters for a count and a time duration, where each separate parameter may be stored in cost table 330 as a transfer-count threshold 502 and a transfer-cycle count threshold 504.

Although six indexed records 420-430 are shown in cost table 330 and five parameters 328, 336, 502, 504, and 340 are shown in each indexed record, in some embodiments, cost table 330 may comprise fewer or more records of parameters, and each record of cost table 330 may comprise fewer or more parameters.

In some embodiments, records 420-430 may be stored and/or indexed in cost table 330 in a specified order. For example, records 420-430 may be ordered based on values of their respective packet-transfer costs. Cost-table-read-pointer generator 412 may be configured to selectively output from cost table 330, a higher packet-transfer cost or a lower packet-transfer cost based on an indication of cost-adjustment signal 326 (e.g., 326A for a higher cost and 326B for a lower cost) and the order of records 420-430 for modifying the packet-transfer cost. In some embodiments, the lowest record index (e.g., record 420) may store the lowest transfer cost 328 value, and as the indices (or pointer addresses) increase (e.g., from record 420 to 430), each successive record may store an increasing transfer cost 328 value. In this manner, the packet-transfer cost 328 may be increased or decreased by incrementing or decrementing the pointer address generated by cost-table-read-pointer generator 412. Cost-adjustment signal 326 may indicate whether to increment or decrement the pointer address. Referring to FIG. 7, in some embodiments, cost-adjustment signal 326 may comprise two separate signals 326A and 326B, where 326A indicates that the pointer address should be incremented (e.g., to point to a higher packet-transfer cost value) and 326B indicates that the pointer address should be decremented (e.g., to point to a lower packet-transfer cost value). However, the disclosure is not limited to any specific way of ordering records in cost table 330, or any specific manner of selecting a particular packet-transfer cost 328 with a read pointer from cost-table-read-pointer generator 412.

In some embodiments, records in cost table 330 may be ordered or sorted based on budget limit 336 values, such that cost-adjustment signal 326 may directly indicate whether budget limit 336 should be increased or decreased to shape packet transfer rates of client 104 for subsequent packet transfers into network on a chip 110.

Cost-adjustment controller 314 may be configured to output parameter values from a record of cost table 330 that is pointed to by cost-table-read-pointer generator 412 for use in enabling packet transfers and generating cost adjustment signal 326 (e.g., 326A and 326B). For example, cost-adjustment controller 314 may read a selected record and transmit a corresponding packet-transfer cost 328 value and/or budget limit 336 value to transfer-enable logic 310. A corresponding transfer-rate threshold 338 value (or transfer-count threshold 502 and transfer-cycle count threshold 504 values) and idle-time threshold 340 value (described in more detail below) of the same record may be transmitted to traffic monitoring logic 312 for monitoring the packet-transmission rate and a length of time that transmission resource 106 may be idle.

In some embodiments, values of an parameters stored in cost table 330 may be configurable (e.g., packet-transfer cost 328, budget limit 336, transfer rate threshold 338 (or transfer-count threshold 502 and transfer-cycle count threshold 504), and idle-time threshold). Referring to the example in FIG. 7, values for packet-transfer cost 328, budget limit 336 idle-time threshold 340, transfer-count threshold 502, transfer-cycle count threshold 504 values, and idle-time threshold 340 may be configured in cost table 330, at a record pointed to by cost-table-read-pointer generator 412, when parameter values and a set-value signal are received based on cost-table configuration and status registers (CSRs).

Figure 6:
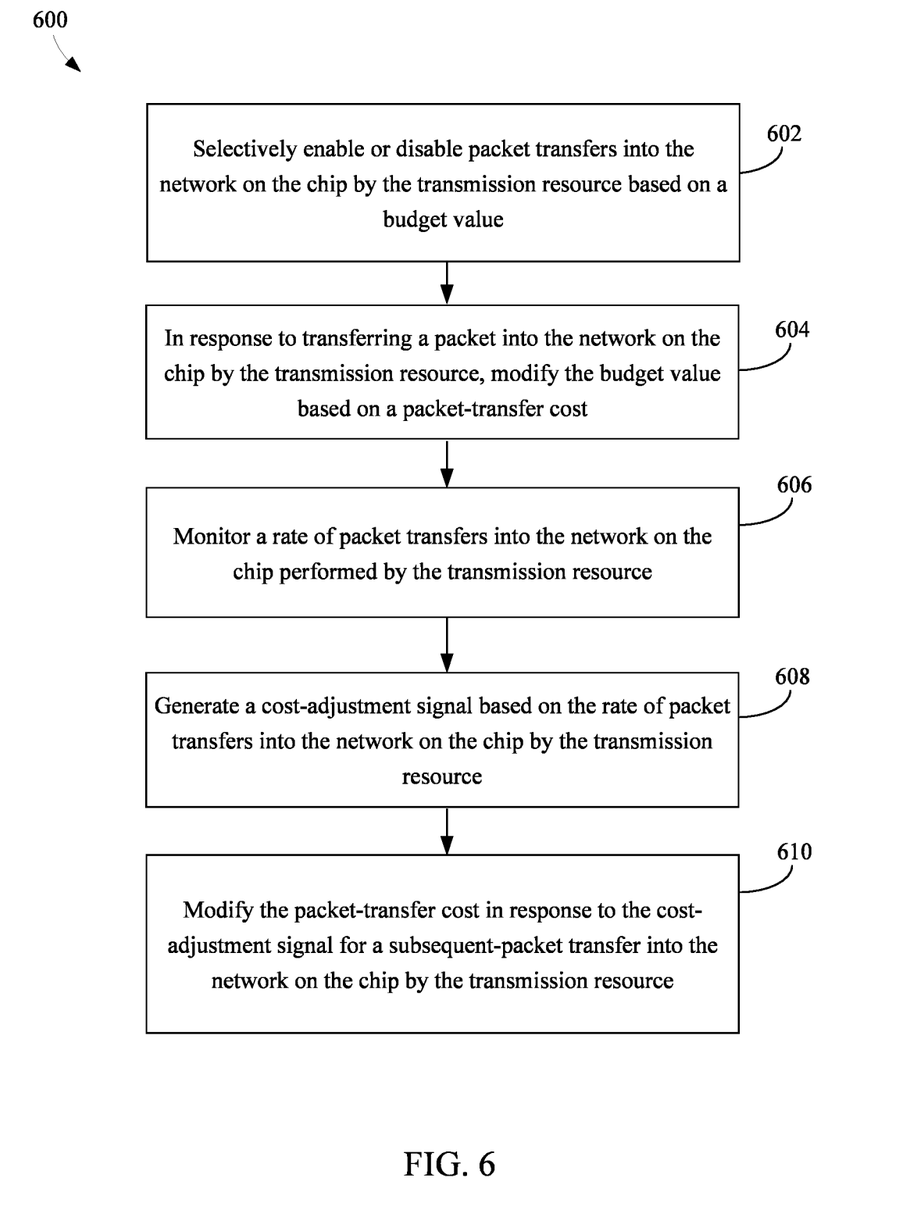
FIG. 6 is a flowchart of a method for dynamically regulating transmissions into a network on a chip, according to an example embodiment.

Traffic shaping circuit 102 may operate in various ways to perform its functions. For instance, FIG. 6 is a flowchart 600 of a method for dynamically regulating transmissions into a network on a chip, according to an example embodiment. Flowchart 600 may be performed as part of flowchart 200 (FIG. 2), such as beginning at step 202. In an embodiment, traffic shaping circuit 102 may operate according to flowchart 600. Flowchart 600 is described as follows with reference to FIGS. 1, 3, 4, 5, and 7.

Flowchart 600 includes step 602. In step 602, packet transfers into the network on the chip by the transmission resource may be selectively enabled or disabled based on a budget value. As described above, budget value 320 may be utilized to determine whether packet transfers are enabled such that if budget value 320 drops too low, packet transfers may be disabled (thus, stopping or slowing network traffic). Budget value 320 may be decreased by the current transfer cost 326 value for each packet that is transferred onto network on a chip 110, and may be increased with packet-transfer credits 332 at each budget-credit cycle 334. If both conditions occur concurrently, both of the credit and the cost may be applied to budget value 320. Moreover, budget value 320 may be capped at budget limit 336, which may be configurable per packet-transfer cost level. Capping budget value 320 at budget limit 336 may provide for configuring a level of burst tolerance that is permitted for client 104. This may be useful when budget value 320 may not be used for a number of cycles and then suddenly incurring a highly demanding job. By providing a configurable budget limit 336, transmission bursts may be capped using a fewer number of shaping resources provided in traffic shaping circuit 102.

In one embodiment, budget value 320 may be accumulated and stored in budget register 716, which may comprise one or more D flip-flops (e.g., see FIG. 7). Although only one budget register 716 is shown in the example of FIG. 7, there may be a plurality of budget register 716 that store budget value 320. The most significant bit (MSB) output from budget register 716 may indicate whether transfers are enabled (e.g., a zero MSB may indicate that transfers are not enabled, and an MSB of one may indicate that transfers are enabled). In this example, if there are seven D flip-flops storing budget values 320, the MSB may indicate that packet transfers are enabled for budget values of 64-127, and disabled for budget values of 63 and lower. However, as described above, the value stored as budget value 320 may be limited on the high-end by budget limit 336 such that, in this example, packet transfers may be enabled where budget values 320 range from 64 to the current value of budget limit 336. Notwithstanding, the disclosure is not limited to any specific range of budget values 320, or any specific type of storage device for budget value 320.

As described above, cost table 330 may store a plurality of packet-transfer cost 328 values and/or a plurality of budget limit 336 values, where the current values utilized in transfer-enable logic 310 for packet-transfer cost 328 and/or budget limit 336 may be determined by reading a record from cost table 330 based on cost-adjustment signal 326. Budget value 320 may be updated as a result of various events. Referring to the example shown in FIG. 7, in response to receiving a timing signal of budget-credit cycles 334, multiplexer 712 may be configured to select packet-transfer credit 332 as an output from the multiplexer. In some embodiments, the time interval for budget credit cycles 334 and/or the credit value for packet-transfer credit 332 may be programmable (e.g., via configuration and status registers (CSR)). In response to receiving a packet-transfer notification 324 signal, multiplexer 712 may be configured to select a current transfer-cost 328 value, which may be pointed to by a read pointer of cost-table-read-pointer generator 412, as the multiplexer output. In response to receiving, concurrent, budget-credit cycles 334 output and packet-transfer notification 324, multiplexer 712 may be configured to select a value of packet-transfer credit 332 less the current transfer-cost 328 value as the multiplexer output. Moreover, in the absence of both of the budget credit cycles 334 output and the packet-transfer notification 324, multiplexer 712 may be configured to select zero as the multiplexer output. The output of multiplexer 712 may be added to the current budget value 320, and if the sum of multiplexer 712 output and current budget value 320 is greater than budget limit 336, multiplexer 714 may be configured to select budget limit 336 as a multiplexer output, which may be entered as a new budget value 320 into budget register 716 (e.g., the D flip-flops). If the sum of multiplexer 712 output and current budget value 320 is not greater than budget limit 336, multiplexer 714 may be configured to select the sum of multiplexer 712 output and current budget value 320 as the multiplexer 714 output, which may be entered as the new budget value 320 in budget register 716 (e.g., the D flip-flops).

In the example shown in FIG. 7, the value of transfer enable 322 may also depend upon whether traffic-shaping circuit 102 is enabled to perform its functions. For example, if a shaper-enable input signal is low, indicating that traffic-shaping circuit 102 is disabled, transfer enable 322 will remain high such that packet transfers by client 104 and transmission resource 106 remain enabled without regulation by traffic shaping circuit 102. On the other hand, if the shaper-enable input signal is high, indicating that traffic-shaping circuit 102 is enabled to function, then transfer enable 322 output may depend on the MSB of budget value 320.

In step 604, in response to transferring a packet into the network on the chip by the transmission resource, the budget value may be modified based on a packet-transfer cost. For example, as described above, traffic-gating logic 316 may be configured to facilitate a handshake between client 104 and transmission resource 106 for transferring packets into network on a chip 110. In the example shown in FIG. 7, client 104 may indicate when valid data is available to be transferred, and in response, traffic-gating logic 316 may communicate a data ready condition to transmission resource 106 under the condition that transfer enable 322 indicates that packet transfers are enabled. Moreover, transmission resource 106 may indicate when it is ready (e.g., resource ready) to transfer a packet onto network on-ramp 108 of network on a chip 110. Traffic-gating logic 316 may be configured to output a packet-transfer notification 324 under the condition that both of the data ready condition and resource ready conditions are high. Packet-transfer notification 324 may indicate that a packet comprising the valid data has been transmitted onto network on-ramp 108 and/or into network on a chip 110. Packet-transfer notification 324 may be sent to transfer-enable logic 310 and may cause budget value 330 to be reduced by the currently selected packet-transfer cost 328 from cost table 330, which may be pointed to by a read pointer of cost-table-read-pointer generator 412, as described above.

In step 606, a rate of packet transfers into the network on the chip, which are performed by the transmission resource, may be monitored. For example, as described above, traffic-monitoring logic 312 may be configured to determine a rate of packet transfers and/or an idle period of transmission resource 106 based on transfer notification 324 signals. In the example shown in FIG. 7, transfer monitoring logic 312 may comprise a packet-transfer counter 722 and a transfer-cycles counter 724, and may receive a transfer-rate threshold 338 from a record of cost table 330 based on a current read pointer value of cost-table-read-pointer generator 412. In some embodiments, transfer-rate threshold may comprise transfer-count threshold 502 and transfer-cycles threshold 504. Packet-transfer counter 722 may be configured to increment each time a packet-transfer notification 324 signal is received from traffic-gating logic 316. Transfer-cycles counter 724 may be configured to count transfer clock cycles until it reaches transfer-cycles threshold 504 or until the counter is cleared in response to a packet-transfer notification 324. Transfer-cycles counter 724 may begin counting again after it is cleared.

Transfer monitoring logic 312 may comprise an idle-cycle counter 720 and receive transfer-cycles threshold 504 from a record of cost table 330 based on a current read pointer value of cost-table-read-pointer generator 412. Idle-cycles counter 720 may be configured increment at each transfer clock cycle while transmission resource 106 stands idle or is waiting to transfer the next packet onto network on-ramp 108. Idle-cycles counter 720 may clear (or reset) when a packet is transferred onto network on-ramp 108 (e.g., based on receiving a packet-transfer notification 324).

In step 608, a cost-adjustment signal may be generated based on the rate of packet transfers into the network on the chip by the transmission resource. In the example of FIG. 7, traffic monitoring logic 312 may be configured to compare a current packet-transfer count from packet-transfer counter 722 to the current transfer-count threshold 502 from cost table 330, and if the transfer-count 722 becomes equal to the transfer-count threshold 502 before the count of transfer-cycles counter 724 matches transfer-cycles threshold 504, traffic-monitoring logic 312 may be configured to transmit a cost-adjustment signal 326 or 326A to table-read-pointer generator 412 (e.g., to increment the read pointer of cost-table-read-pointer generator 412). Moreover, traffic monitoring logic 312 may be configured to compare a count value of transfer-cycle counter 724 to the current transfer-cycle threshold 504 from cost table 330, and if the count of transfer-cycle counter 724 becomes equal to the transfer-cycle threshold 504 before the packet-transfer count from packet-transfer counter 722 becomes equal to transfer-count threshold 502, traffic-monitoring logic 312 may be configured to clear (e.g., reset) packet-transfer counter 722 and transfer-cycle counter 724, and begin again to count packet transfers (e.g., packet-transfer notifications 324) and transfer clock cycles without generating a cost-adjustment signal 326 (e.g., maintaining the same read-pointer output from cost-table-read-pointer generator 412).

Furthermore, traffic monitoring logic 312 may be configured to compare a current count of idle-cycles counter 720 to the current idle-time threshold 340 from cost table 330, and if the current idle-cycles count 720 becomes equal to the idle-time threshold 340, traffic-monitoring logic 312 may be configured to transmit a cost-adjustment signal 326 or cost-adjustment signal 326B to cost-table-read-pointer generator 412 (e.g., for decrementing the read pointer of cost-table-read-pointer generator 412). In some embodiments, other cost-decreasing mechanisms may be implemented. For example, traffic monitoring logic 312 may be configured to compare packet-transfer rates to a low transfer-rate threshold to determine when to transmit a cost-adjustment signal 326 for decrementing read pointer of cost-table-read-pointer generator to lower a packet-transfer cost 328.

In step 610, the packet-transfer cost may be modified in response to the cost-adjustment signal for a subsequent-packet transfer into the network on the chip by the transmission resource. For example, the current packet-transfer cost 328 may be modified by reading a higher or lower packet-transfer cost 328 from cost table 330 for use in transfer-enable logic 310. As described above, in the example of FIG. 7, in response to a count value of transfer-counter 722 becoming equal to the transfer-count threshold 502 before the count of transfer-cycles counter 724 matches transfer-cycles threshold 504, traffic-monitoring logic 312 may transmit a cost-adjustment signal 326 or 326A to table-read-pointer generator 412. As a result, this cost-adjustment signal 326 or 326A may indicate that the read pointer of cost-table-read-pointer generator 412 should be incremented, which may result in reading a higher packet-transfer cost 328 value from cost table 330. In another example, as described above, in response to a current count of idle-cycles counter 720 becoming equal to idle-time threshold 340, traffic-monitoring logic 312 may transmit a cost-adjustment signal 326 or cost-adjustment signal 326B to cost-table-read-pointer generator 412. As a result, this cost-adjustment signal 326 or 326B may indicate that the read pointer of cost-table-read-pointer generator 412 should be decremented, which may result in reading a lower packet-transfer cost 328 value from cost table 330. Transfer-enable logic 310 may be configured to utilize the higher or lower packet-transfer cost 328 value (e.g., an adjusted cost value) in applying a cost reduction to budget value 320 in response to receiving a subsequent packet-transfer notification 324. For example, in response to transferring the subsequent packet into network on the chip 110 by transmission resource 106, transfer-enable logic 310 may be configured to modify budget value 320 based on the adjusted packet-transfer cost 328 for selectively enabling or disabling a further-subsequent-packet transfer into network on the chip 110 by transmission resource 106. The behavior of the shaper resulting from variations in the read pointer and different cost table entries may be nonlinear in time, and depends upon the sequence of transmissions generated by the client.

As described above, in some embodiments, cost table 330 entries may be configured such that the lowest address in that table comprises the lowest packet-transfer cost 328 value and any higher address has a non-decreasing cost value (e.g., each increasing record index stores the same or a higher cost value than the prior record). In this configuration, bursts of packet traffic may result in increased table read pointer values and higher selected packet-transfer cost 328 values, while increasing transmitter idle periods may result in lower table read pointer values and lower selected packet-transfer cost 328 values from cost table 330. Various models may be utilized to generate packet-transfer cost change patterns (e.g., for increasing or decreasing packet-transfer costs). For example, an exponential cost change pattern or a linear type of cost change pattern may be utilized. In an example of an exponential pattern, the relative packet-transfer cost in successive cost table 330 records may double the previous record's cost. In an example of a linear pattern, each packet-transfer cost 328 value in cost table 330 may be proportional to its record index plus a constant value. Budget limits 336 and/or the high-end of the range in budget value 320 may also be modified to control traffic bursts and modify burst tolerance. In this regard, traffic shaping circuit may be highly configurable to self-adjust in reaction to its own traffic bursts without global awareness of traffic on network on the chip 110. The behavior of traffic shaping may be linear or nonlinear depending upon how cost table 330 parameters are configured.

Example linear and exponential cost adjustment scenarios are provided below and are presented using Python language. Table read pointers may be incremented based on the variable "i" from zero to some number of records in cost table 330. The term "M" may represent a number (M) of packets transmitted in a number "N" of epoch clock cycles for incrementing the table read pointer. The term "P" may represent some number of idle clock cycles (e.g., clock cycles without a packet transmission) for decrementing the table read pointer. M, N, and P may all be stored within a cost table record.

```
# Stimulus scenarios
# Scenario 0: Exponential
expCostTbl = [ ]
for i in range(constCostTblSize) :
    expCostTbl.append(costEntry( \
        "Exponential",              #title
        2**i,                       #cost
        min(32+4*(2**i),63),        #budget stop
        2**i,                       #ptrDecTimer
        4,                          #ptrIncMTrans
        8*2**i))                    #ptrIncNCyc
expBudgetMax = 63
expEpochCycles = 32
expEpochCredit = 16
# Scenario 1: Linear
linCostTbl = [ ]
for i in range(constCostTblSize) :
    linCostTbl.append(costEntry( \
        "Linear",                   #title
        1+(3*i),                    #cost
        min((36+12*i),63),          #budget stop
        5*(i+1),                    #ptrDecTimer
        4,                          #ptrIncMTrans
        4*(3*i+4)))                 #ptrIncNCyc
linBudgetMax = 63
linEpochCycles = 16
linEpochCredit = 16
```

III. Example SOC Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 100, 300, 400, 500, and 700 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Referring again to FIG. 7, traffic-shaping circuit 102 may be implemented in a SOC comprising network on a chip 110. Budget register 716 may store budget value 320 that may be accumulated over time based on budget-credit cycles 334 output from a programmable epoch timer. Each time the epoch timer expires, a programmable amount of packet-transfer credit 332 may be added to budget 320. For each packet transfer that is sent out into network on a chip 110, the value of a current transfer cost 328 may be incurred and subtracted from budget value 320. Once budget value 320 falls below its low threshold, traffic shaping circuit 102 may disable further traffic at network on-ramp 108 until the next epoch timer expiry. Budget register 716 may store budget value 320, which may comprise a user-defined bit width. The MSB of budget value 320, output from budget register 716, may indicate whether a packet transfer is enabled (e.g., may indicate the low threshold for budget value 320 at half-scale of the numerical range of budget value 320). Utilizing the MSB to act as the low threshold for budget value 320 may simplify critical-path timing for the data-valid and data-ready handshake in traffic-gating logic 316, as well as for feedback towards other sections (e.g., traffic-monitoring logic 312 and transfer-enable logic 310) of traffic shaping circuit 102 in comparison to threshold comparison circuits involving more bits.

Utilizing an adjustable packet-transfer cost 328 value provides for better tuning of packet-transfer rates at network on-ramp 108. To implement an adjustable packet-transfer cost 328, cost table 330, which may comprise a user-definable size, is provided to allow for many different configurations. Each record 420-430 in cost table 330 may hold several parameters that define operations of traffic shaping circuit 102. In one example, the records may be arranged from lowest packet-transfer cost (record 0) to higher cost (record N), and the current cost index (e.g., the current record selection of cost-table-read-pointer generator 412) may be controlled based on monitored packet traffic behavior (e.g., packet-transfer notifications 324) and cost table 330 configuration. The cost table index selection may be incremented as traffic-shaping circuit 102 allows more transfers, which in turn, may depress the rate of packet transfers. Moreover, as idle-cycles accumulate over time without packet transfers, the cost table index selection may be decreased in order to ease restrictions on subsequent packet transfers. Each record of cost table 330 may include fields comprising the following parameters (e.g., where cost values may be generally non-decreasing for increasing cost index). Packet-transfer cost 328 may specify the cost that is subtracted from budget value 320 for each packet transaction that is permitted. Budget limit 336 may specify a limit value (e.g., a maximum budget value) indicating the point at which budget register 716 saturates. This limit value may determine how long traffic-shaping circuit 102 can sustain a traffic burst at the current cost index before packet transfers are disabled. Transfer-count threshold 502 and transfer-cycle-count threshold 504 (or transfer-rate threshold 338) may specify how many packet transfers at the currently selected packet-transfer cost, over how many packet transfer time cycles, may trigger a move to select a higher packet-transfer cost 328 entry in cost table 330. Idle-time threshold 340 may specify how much time (e.g., in packet transfer clock cycles) must pass since the most recent packet transaction before the pointer of cost-table-read-pointer generator 412 is decremented, to point to a lower value cost entry in cost 330.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a traffic shaping circuit is communicatively coupled between a client and a transmission resource that is operable to regulate packet transfers into a network on behalf of the client. The traffic shaping circuit comprises transfer-enable logic configured to selectively enable or disable packet transfers into the network by the transmission resource based on a budget value. In response to transferring a packet into the network by the transmission resource, the transfer-enabling logic may modify the budget value based on a packet-transfer cost. The traffic shaping circuit further comprises traffic-monitoring logic configured to monitor a rate of packet transfers into the network performed by the transmission resource, and generate a cost-adjustment signal based on the rate of packet transfers into the network by the transmission resource. The traffic shaping circuit further comprises a cost-adjustment controller configured to modify the packet-transfer cost in response to the cost-adjustment signal for a subsequent-packet transfer into the network by the transmission resource.

In an embodiment of the foregoing traffic shaping circuit, the transfer-enable logic is further configured to, in response to transferring a subsequent packet into the network by the transmission resource, modify the budget value based on the modified packet-transfer cost for selectively enabling or disabling a further-subsequent-packet transfer into the network by the transmission resource.

In an embodiment of the foregoing traffic shaping circuit, the transfer-enable logic is further configured to modify the budget value over time based on packet-transfer credits and a budget limit.

In an embodiment of the foregoing traffic shaping circuit, the cost-adjustment controller is further configured to modify the budget limit in response to the cost-adjustment signal.

In an embodiment of the foregoing traffic shaping circuit, the cost-adjustment signal indicates whether to increase the packet-transfer cost in response to the rate of packet transfers into the network being greater than a transfer-rate threshold, or decrease the packet-transfer cost.

In an embodiment of the foregoing traffic shaping circuit, the cost-adjustment controller is further configured to modify the transfer-rate threshold and the idle-time threshold in response to the cost-adjustment signal.

In an embodiment of the foregoing traffic shaping circuit, the cost-adjustment controller further comprises a cost table having a plurality of records each storing a respective packet-transfer cost. The records are ordered in the cost table based on values of their respective packet-transfer costs. A cost-table-read-pointer generator is configured to selectively output from the cost table a higher packet-transfer cost or a lower packet-transfer cost based on an indication of the cost-adjustment signal and the ordered records for said modifying the packet-transfer cost.

In an embodiment of the foregoing traffic shaping circuit, each of the plurality of records further stores a respective budget limit, a respective transfer-rate threshold, and a respective idle-time threshold.

In an embodiment of the foregoing traffic shaping circuit, one or more of the packet-transfer cost, the budget limit, the transfer-rate threshold, or the idle-time threshold is configurable.

In an embodiment, a method for shaping traffic comprising packets transferred by a transmission resource into a network on behalf of a client comprises selectively enabling or disabling packet transfers into the network by the transmission resource based on a budget value. In response to transferring a packet into the network by the transmission resource, the budget value may be modified based on a packet-transfer cost. A rate of packet transfers into the network performed by the transmission resource is monitored. A cost-adjustment signal is generated based on the rate of packet transfers into the network by the transmission resource. The packet-transfer cost is modified in response to the cost-adjustment signal for a subsequent-packet transfer into the network by the transmission resource.

In an embodiment of the foregoing method, in response to transferring a subsequent packet into the network by the transmission resource, the budget value is modified based on the modified packet-transfer cost for selectively enabling or disabling a further-subsequent-packet transfer into the network by the transmission resource.

In an embodiment of the foregoing method, the budget value is modified over time based on packet-transfer credits and a budget limit.

In an embodiment of the foregoing method, the budget limit is modified in response to the cost-adjustment signal.

In an embodiment of the foregoing method, the cost-adjustment signal indicates whether to increase the packet-transfer cost in response to the rate of packet transfers into the network being greater than a transfer-rate threshold, or decrease the packet-transfer cost.

In an embodiment of the foregoing method, the transfer-rate threshold and the idle-time threshold are modified in response to the cost-adjustment signal.

In an embodiment of the foregoing method, a cost-table-read-pointer generator selectively outputs a higher packet-transfer cost or a lower packet-transfer cost from a cost table. The cost table has a plurality of records, where each record stores a respective packet-transfer cost. The records are ordered in the cost table based on values of their respective packet-transfer costs. The selective outputting is performed based on an indication of the cost-adjustment signal and the ordered records for the modifying of the packet-transfer cost.

In an embodiment of the foregoing method, each of the plurality of records further stores a respective budget limit, a respective transfer-rate threshold, and a respective idle-time threshold.

In an embodiment of the foregoing method, one or more of the packet-transfer cost, the budget limit, the transfer-rate threshold, or the idle-time threshold is configurable.

In an embodiment, a traffic shaping circuit is communicatively coupled between a client and a transmission resource that is operable to regulate packet transfers into a network on behalf of the client. The traffic shaping circuit comprises transfer-enable logic configured to selectively enable or disable packet transfers into the network by the transmission resource based on a budget value, adjust the budget value based on a timeline according to a budget limit, and in response to transferring a packet into the network by the transmission resource, adjust the budget value based on a packet-transfer cost. The traffic shaping circuit further comprises traffic-monitoring logic configured to monitor a rate of packet transfers into the network performed by the transmission resource and generate a budget-limit-adjustment signal based on the rate of packet transfers into the network by the transmission resource. The traffic shaping circuit further comprises a budget-limit-adjustment controller configured to adjust the budget limit in response to the budget-limit-adjustment signal for controlling enabling or disabling a subsequent-packet transfer into the network by the transmission resource.

In an embodiment of the foregoing traffic shaping circuit, the budget-limit-adjustment signal indicates whether to increase the budget limit in response to the rate of packet transfers into the network being greater than a transfer-rate threshold, or decrease the budget limit.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A traffic shaping circuit communicatively coupled between a client and a transmission resource that is operable to regulate packet transfers into a network on behalf of the client, the traffic shaping circuit comprising:
    transfer-enable logic configured to:
        selectively enable or disable packet transfers into the network by the transmission resource based on a budget value; and
        in response to transferring a packet into the network by the transmission resource, modify the budget value based on a packet-transfer cost, the packet-transfer cost being a value that is used to modify the budget value each time a packet is transferred into the network by the transmission resource;
    traffic-monitoring logic configured to:
        monitor a rate of packet transfers into the network performed by the transmission resource; and
        generate a cost-adjustment signal based on the rate of packet transfers into the network by the transmission resource, wherein the cost-adjustment signal indicates whether to:
            increase the packet-transfer cost in response to the rate of packet transfers into the network being greater than a transfer-rate threshold; or
            decrease the packet-transfer cost; and
    a cost-adjustment controller configured to:
        modify the packet-transfer cost in response to the cost-adjustment signal for a subsequent-packet transfer into the network by the transmission resource.

2. The traffic shaping circuit of claim 1, wherein the transfer-enable logic is further configured to:
    in response to transferring a subsequent packet into the network by the transmission resource, modify the budget value based on the modified packet-transfer cost for selectively enabling or disabling a further-subsequent-packet transfer into the network by the transmission resource.

3. The traffic shaping circuit of claim 1, wherein the transfer-enable logic is further configured to modify the budget value over time based on packet-transfer credits and a budget limit.

4. The traffic shaping circuit of claim 3, wherein the cost-adjustment controller is further configured to modify the budget limit in response to the cost-adjustment signal.

5. The traffic shaping circuit of claim 1, wherein the cost-adjustment controller is further configured to modify the transfer-rate threshold and an idle-time threshold in response to the cost-adjustment signal.

6. The traffic shaping circuit of claim 1, wherein the cost-adjustment controller further comprises:
a cost table having a plurality of records each storing a respective packet-transfer cost, wherein the records are ordered in the cost table based on values of their respective packet-transfer costs, and
a cost-table-read-pointer generator configured to selectively output from the cost table a higher packet-transfer cost or a lower packet-transfer cost based on an indication of the cost-adjustment signal and the ordered records for said modifying the packet-transfer cost.

7. The traffic shaping circuit of claim 6, wherein each of the plurality of records further stores a respective budget limit, a respective transfer-rate threshold, and a respective idle-time threshold.

8. The traffic shaping circuit of claim 7, wherein one or more of the packet-transfer cost, the budget limit, the transfer-rate threshold, or the idle-time threshold is configurable.

9. A method for shaping traffic comprising packets transferred by a transmission resource into a network on behalf of a client, the method comprising:
selectively enabling or disabling packet transfers into the network by the transmission resource based on a budget value;
in response to transferring a packet into the network by the transmission resource, modifying the budget value based on a packet-transfer cost, the packet-transfer cost being a value that is used to modify the budget value each time a packet is transferred into the network by the transmission resource;
monitoring a rate of packet transfers into the network performed by the transmission resource;
generating a cost-adjustment signal based on the rate of packet transfers into the network by the transmission resource, wherein the cost-adjustment signal indicates whether to:
increase the packet-transfer cost in response to the rate of packet transfers into the network being greater than a transfer-rate threshold; or
decrease the packet-transfer cost; and
modifying the packet-transfer cost in response to the cost-adjustment signal for a subsequent-packet transfer into the network by the transmission resource.

10. The method of claim 9, further comprising:
in response to transferring a subsequent packet into the network by the transmission resource, modifying the budget value based on the modified packet-transfer cost for selectively enabling or disabling a further-subsequent-packet transfer into the network by the transmission resource.

11. The method of claim 9, further comprising:
modifying the budget value over time based on packet-transfer credits and a budget limit.

12. The method of claim 11, further comprising:
modifying the budget limit in response to the cost-adjustment signal.

13. The method of claim 9, further comprising: modifying the transfer-rate threshold and an idle-time threshold in response to the cost-adjustment signal.

14. The method of claim 9, further comprising:
selectively outputting, by a cost-table-read-pointer generator, a higher packet-transfer cost or a lower packet-transfer cost from a cost table;
wherein the cost table has a plurality of records each storing a respective packet-transfer cost and the records are ordered in the cost table based on values of their respective packet-transfer costs; and
wherein the selectively outputting is performed based on an indication of the cost-adjustment signal and the ordered records for said modifying the packet-transfer cost.

15. The method of claim 14, wherein:
each of the plurality of records further stores a respective budget limit, a respective transfer-rate threshold, and a respective idle-time threshold.

16. The method of claim 15, wherein one or more of the packet-transfer cost, the budget limit, the transfer-rate threshold, or the idle-time threshold is configurable.

17. A traffic shaping circuit communicatively coupled between a client and a transmission resource that is operable to regulate packet transfers into a network on behalf of the client, the traffic shaping circuit comprising:
transfer-enable logic configured to:
selectively enable or disable packet transfers into the network by the transmission resource based on a budget value;
adjust the budget value based on a timeline according to a budget limit; and
in response to transferring a packet into the network by the transmission resource, adjust the budget value based on a packet-transfer cost, the packet-transfer cost being a value that is used to modify the budget value each time a packet is transferred into the network by the transmission resource;
traffic-monitoring logic configured to:
monitor a rate of packet transfers into the network performed by the transmission resource; and
generate a budget-limit-adjustment signal based on the rate of packet transfers into the network by the transmission resource, wherein the budget-limit-adjustment signal indicates whether to:
increase the budget limit in response to the rate of packet transfers into the network being greater than a transfer-rate threshold; or
decrease the budget limit; and
a budget-limit-adjustment controller configured to:
adjust the budget limit in response to the budget-limit-adjustment signal for controlling enabling or disabling a subsequent-packet transfer into the network by the transmission resource.

18. The traffic shaping circuit of claim 17, wherein the budget-limit-adjustment controller comprises:
a table having a plurality of records each record storing a respective budget limit, wherein the records are ordered in the table based on values of their respective budget limit, and
a table-read-pointer generator configured to selectively output from the table a higher budget limit or a lower budget limit based on an indication of the budget-limit-adjustment signal and the ordered records for said adjusting the budget limit.

19. A traffic shaping circuit communicatively coupled between a client and a transmission resource that is operable to regulate packet transfers into a network on behalf of the client, the traffic shaping circuit comprising:
transfer-enable logic configured to:

selectively enable or disable packet transfers into the network by the transmission resource based on a budget value; and in response to transferring a packet into the network by the transmission resource, modify the budget value based on a packet-transfer cost;

traffic-monitoring logic configured to:
monitor a rate of packet transfers into the network performed by the transmission resource; and generate a cost-adjustment signal based on the rate of packet transfers into the network by the transmission resource; and a cost-adjustment controller configured to:
modify the packet-transfer cost in response to the cost-adjustment signal for a subsequent-packet transfer into the network by the transmission resource; wherein the cost-adjustment controller comprises:
a cost table having a plurality of records each storing a respective packet-transfer cost, wherein the records are ordered in the cost table based on values of their respective packet-transfer costs, and a cost-table-read-pointer generator configured to selectively output from the cost table a higher packet-transfer cost or a lower packet-transfer cost based on an indication of the cost-adjustment signal and the ordered records for said modifying the packet-transfer cost.

20. A method for shaping traffic comprising packets transferred by a transmission resource into a network on behalf of a client, the method comprising:

selectively enabling or disabling packet transfers into the network by the transmission resource based on a budget value;

in response to transferring a packet into the network by the transmission resource, modifying the budget value based on a packet-transfer cost;

monitoring a rate of packet transfers into the network performed by the transmission resource;

generating a cost-adjustment signal based on the rate of packet transfers into the network by the transmission resource;

selectively outputting, by a cost-table-read-pointer generator, a higher packet-transfer cost or a lower packet-transfer cost from a cost table, wherein:
the cost table has a plurality of records, each record storing a respective packet-transfer cost and the records are ordered in the cost table based on values of their respective packet-transfer costs, and the selectively outputting is performed based on an indication of the cost-adjustment signal and the ordered records for modifying the packet-transfer cost; and modifying the packet-transfer cost in response to the cost-adjustment signal for a subsequent-packet transfer into the network by the transmission resource.

* * * * *